(12) United States Patent
Ebrahimian

(10) Patent No.: US 10,878,694 B2
(45) Date of Patent: Dec. 29, 2020

(54) ESTIMATING A MILEAGE OF A VEHICLE

(71) Applicant: Ziba Ebrahimian, Isfahan (IR)

(72) Inventor: Ziba Ebrahimian, Isfahan (IR)

( * ) Notice: Subject to any disclaimer, the term of this patent is extended or adjusted under 35 U.S.C. 154(b) by 219 days.

(21) Appl. No.: 16/120,383

(22) Filed: Sep. 3, 2018

(65) Prior Publication Data

US 2019/0004536 A1   Jan. 3, 2019

Related U.S. Application Data

(60) Provisional application No. 62/553,925, filed on Sep. 4, 2017.

(51) Int. Cl.
| | | |
|---|---|---|
| *G08G 1/01* | (2006.01) | |
| *G05D 1/02* | (2020.01) | |
| *G08G 1/017* | (2006.01) | |
| *G01C 22/00* | (2006.01) | |
| *G08G 1/04* | (2006.01) | |
| *G07B 15/02* | (2011.01) | |
| *G07B 15/06* | (2011.01) | |

(52) U.S. Cl.
CPC ........... *G08G 1/0129* (2013.01); *G01C 22/00* (2013.01); *G05D 1/0253* (2013.01); *G08G 1/0116* (2013.01); *G08G 1/0175* (2013.01); *G08G 1/04* (2013.01); *G05D 2201/0213* (2013.01); *G07B 15/02* (2013.01); *G07B 15/06* (2013.01); *G07B 15/063* (2013.01)

(58) Field of Classification Search
CPC ...... G08G 1/0129; G08G 1/0116; G08G 1/04; G08G 1/0175; G05D 1/0253; G05D 2201/0213; G01C 22/00; G07B 15/063; G07B 15/06; G07B 15/02
See application file for complete search history.

(56) References Cited

U.S. PATENT DOCUMENTS

| | | | |
|---|---|---|---|
| 5,359,528 A | 10/1994 | Haendel | |
| 6,087,965 A | 7/2000 | Murphy | |
| 7,542,833 B2 | 6/2009 | Kelly et al. | |
| 9,595,139 B1 * | 3/2017 | Breed et al. | G07B 15/063 |
| 2010/0318286 A1 * | 12/2010 | Lorkowski et al. | G08G 1/0129 |
| | | | 701/119 |
| 2012/0010804 A1 * | 1/2012 | Fliegen | G08G 1/04 |
| | | | 701/119 |
| 2013/0010116 A1 * | 1/2013 | Breed | G08G 1/0175 |
| | | | 348/148 |

(Continued)

FOREIGN PATENT DOCUMENTS

| | | | | |
|---|---|---|---|---|
| CN | 203242035 U | * | 10/2013 | G07B 15/06 |
| CN | 203858680 U | * | 10/2014 | G07B 15/06 |

OTHER PUBLICATIONS

Translation of CN203242035U, Induced electronic toll collection system, Liu, 2013, 4 pages (Year: 2013).*

(Continued)

*Primary Examiner* — Dale W Hilgendorf
(74) *Attorney, Agent, or Firm* — Bajwa IP Law Firm; Haris Zaheer Bajwa

(57) ABSTRACT

A method for estimating a mileage of a vehicle is disclosed. The method includes detecting a first location of the vehicle at a first moment by capturing an image of the vehicle by a first camera of a plurality of cameras, and estimating a primary distance of a plurality of distances. The primary distance may be associated with the first location.

18 Claims, 3 Drawing Sheets

(56) References Cited

U.S. PATENT DOCUMENTS

2014/0267725 A1* 9/2014 Smith ................... G08G 1/0175
348/148
2016/0341557 A1* 11/2016 Knodo et al. .......... G07B 15/06

OTHER PUBLICATIONS

Translation of CN203858680U, Machine vision-based highway fast toll collective device, Li, 2014, 6 pages (Year: 2014).*
Montag. "Identifying Odometer Fraud: Evidence from the Used Car Market in the Czech Republic." (2017).

* cited by examiner

ESTIMATING A MILEAGE OF A VEHICLE

CROSS-REFERENCE TO RELATED APPLICATION

This application claims the benefit of priority from U.S. Provisional Patent Application Ser. No. 62/553,925, filed on Sep. 4, 2017, and entitled "A SYSTEM AND METHOD FOR MONITORING VEHICLE HISTORY," which is incorporated herein by reference in its entirety.

TECHNICAL FIELD

The present disclosure generally relates to vehicles, and particularly, to vehicle traffic monitoring.

BACKGROUND

Vehicle mileage may be a useful parameter for vehicle assessment. Based on vehicle mileage, the quality of different elements of a vehicle may be assessed, and possible damage to the vehicle may be avoided.

A common method for measuring vehicle mileage is by using the vehicle odometer, which is installed in most vehicles by vehicle manufacturers. Other client-based methods also exist which require the clients to install measurement tools on the vehicle. However, most odometers and other measurement tools may be manually altered (for example, by the owner or the driver of the vehicle) to show incorrect values for vehicle mileage. There is, therefore, a need for a method that estimates vehicle mileage without being influenced by internal vehicle systems.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general embodiment, the present disclosure describes a method for estimating a mileage of a vehicle. The method includes detecting a first location of the vehicle at a first moment by capturing an image of the vehicle by a first camera of a plurality of cameras, and estimating a primary distance of a plurality of distances. The primary distance may be associated with the first location.

In an exemplary embodiment, estimating the primary distance may include calculating the primary distance according to an operation defined by $ED_0 = 2 \times d_0$, where $d_0$ is a length of a route between a predefined place and the first location, and $ED_0$ is the primary distance. In an embodiment, capturing an image of the vehicle by the first camera may include capturing the image of the vehicle by a license plate recognition (LPR) camera.

In an exemplary embodiment, an exemplary method may further include detecting an $i^{th}$ location of the vehicle at an $i^{th}$ moment by capturing an image of the vehicle by an $i^{th}$ camera of the plurality of cameras, where $2 \leq i \leq N_c$ is an integer number and $N_c$ is the number of the plurality of cameras, detecting an $(i+1)^{th}$ location of the vehicle at an $(i+1)^{th}$ moment by capturing an image of the vehicle by an $(i+1)^{th}$ camera of the plurality of cameras, and estimating a first distance of the plurality of distances according to an operation defined by $ED_1 = \Sigma_{i=1}^{N_c} d_i + ED_0$, where $d_i$ is a length of a route between the $i^{th}$ location and the $(i+1)^{th}$ location, and $ED_1$ is the first distance. In an embodiment, the $i^{th}$ moment and the $(i+1)^{th}$ moment may satisfy a condition according to $t_{i+1} - t_i < t_0$, where $t_0$ is a temporal threshold, $t_i$ is the $i^{th}$ moment, and $t_{i+1}$ is the $(i+1)^{th}$ moment.

In an exemplary embodiment, estimating the first distance may include selecting the route between the $i^{th}$ location and the $(i+1)^{th}$ location from a longest path of a plurality of paths, a shortest path of the plurality of paths, and an average of the plurality of paths. Each of the plurality of paths may include a plurality of roads between the $i^{th}$ location and the $(i+1)^{th}$ location.

In an exemplary embodiment, an exemplary method may further include estimating a second distance of the plurality of distances according to an operation defined by $ED_2 = (N_c - 1)d_{ave} + k$, where $d_{ave}$ is an average distance associated with the plurality of cameras, k is a constant, and $ED_2$ is the second distance.

In an exemplary embodiment, an exemplary method may further include estimating a third distance of the plurality of distances according to an operation defined by $ED_3 = ED_{ave} \Sigma_{m=1}^{M} T$, where $ED_{ave}$ is an average distance associated with the plurality of distances, T is a given period of time, M is an integer constant associated with the given period of time, $1 \leq m \leq M$ is an integer number, and $ED_3$ is the third distance.

In an exemplary embodiment, an exemplary method may further include estimating an intra-city mileage of the vehicle according to an operation defined by $ED_{city} = f_{city}(\Sigma_{m_1=1}^{M_1} ED_1, \Sigma_{m_2=1}^{M_2} ED_2, ED_3)$, where $f_{city}$ is a function of the plurality of distances, $M_1$ and $M_2$ are integer constants, $1 \leq m_1 \leq M_1$ and $1 \leq m_2 \leq M_2$ are integer numbers, and $ED_{city}$ is the intra-city mileage.

In an exemplary embodiment, an exemplary method may further include estimating an intercity mileage of the vehicle according to an operation defined by $ED_{inter} = f_{inter}(\Sigma_{m_1=1}^{M_1} ED_1, \Sigma_{m_2=1}^{M_2} ED_2, ED_3)$, where $f_{inter}$ is a function of the plurality of distances, and $ED_{inter}$ is the intercity mileage.

In an exemplary embodiment, an exemplary method for estimating a mileage of a vehicle is disclosed. The exemplary method includes detecting an $i^{th}$ location of the vehicle by capturing an image of the vehicle by an $i^{th}$ camera of a plurality of urban cameras where $1 \leq i \leq N_1$ is an integer number and $N_1$ is the number of the plurality of urban cameras, detecting an $(i+1)^{th}$ location of the vehicle by capturing an image of the vehicle by an $(i+1)^{th}$ camera of the plurality of urban cameras, estimating a first urban distance of a plurality of urban distances according to the $i^{th}$ location and the $(i+1)^{th}$ location, estimating a second urban distance of the plurality of urban distances, estimating a third urban distance of the plurality of urban distances, estimating an intra-city mileage of the vehicle according to the plurality of urban distances, detecting a $j^{th}$ location of the vehicle by capturing an image of the vehicle by a $j^{th}$ camera of a plurality of intercity cameras, where $1 \leq j \leq N_2$ is an integer number and $N_2$ is the number of the plurality of intercity cameras, detecting a $(j+1)^{th}$ location of the vehicle by capturing an image of the vehicle by a $(j+1)^{th}$ camera of the plurality of intercity cameras, estimating a first intercity distance of a plurality of intercity distances according to the $j^{th}$ location and the $(j+1)^{th}$ location, estimating a second intercity distance of the plurality of intercity distances, estimating a third intercity distance of the plurality of intercity distances, estimating an intercity mileage of the vehicle according to the plurality of intercity distances, estimating a total distance according to the intra-city mileage and the intercity mileage, and estimating an odometer mileage variable of the vehicle according to the total distance. In an exemplary embodiment, each of the plurality of urban cameras may be installed on an urban road, and each of the plurality of intercity cameras may be installed on an intercity road.

In an exemplary embodiment, an exemplary system for estimating a mileage of a vehicle is disclosed. The exemplary system may include a first camera of a plurality of cameras, and a processor. In an embodiment, the first camera may be configured to capture a first image of the vehicle. In an exemplary embodiment, the processor may be configured to receive the first image of the vehicle, detect a first location of the vehicle at a first moment based on the first image of the vehicle, and estimate a primary distance of a plurality of distances. The first location may be associated with the first camera, and the primary distance may be associated with the first location.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method and an exemplary system for estimating a mileage of a vehicle. The exemplary method estimates the mileage (or distance traveled by the vehicle, hereinafter may also be referred to as distance) based on a series of locations of the vehicle that may be extracted from a number of images of the vehicle taken by a number of cameras. Based on possible routes that may be passed by the vehicle between the detected locations, an estimation of the vehicle mileage may be obtained.

Figure 1:
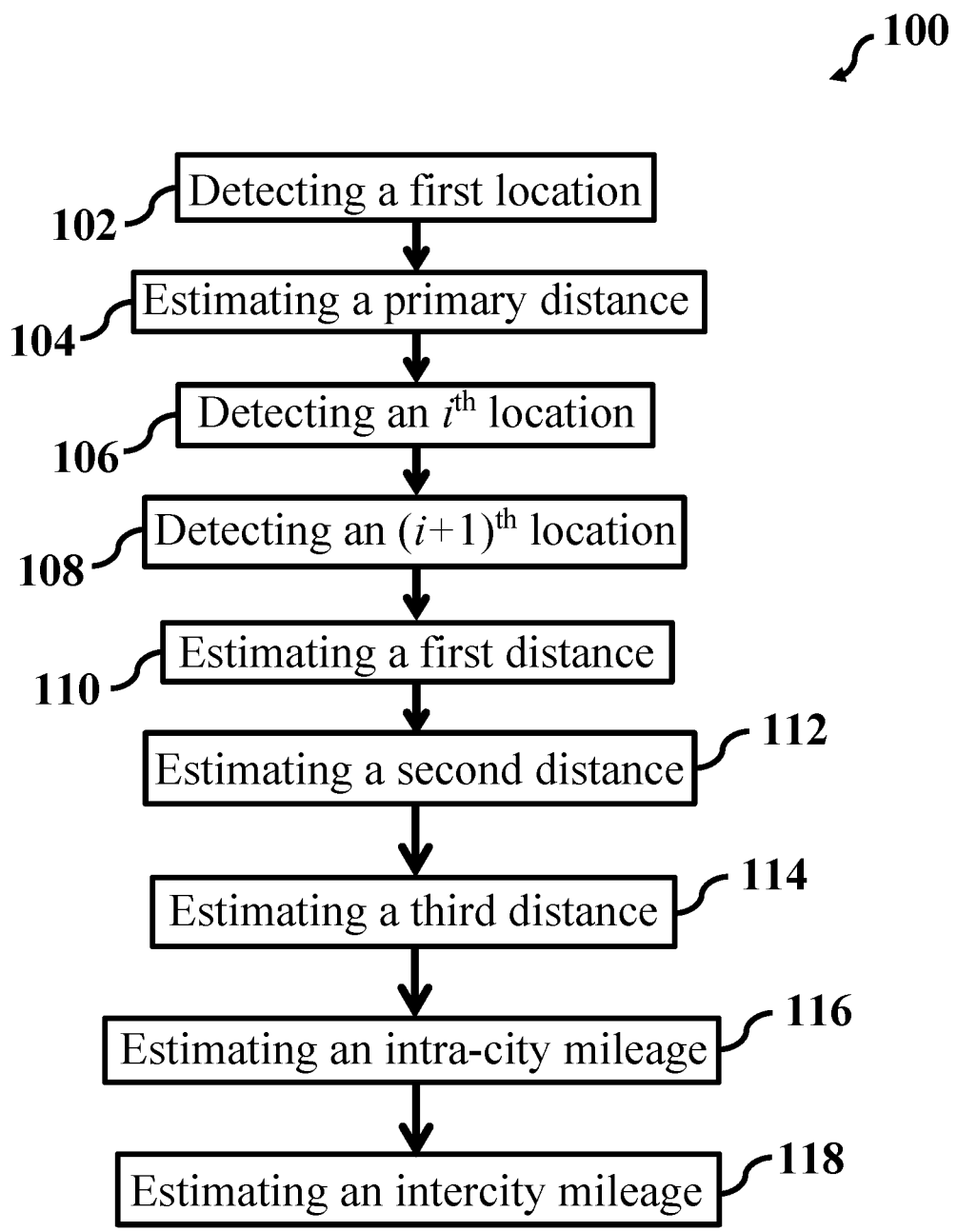
FIG. 1 shows a flowchart of an exemplary embodiment of a method for estimating a mileage of a vehicle, consistent with one or more exemplary embodiments of the present disclosure.
Figure 2:
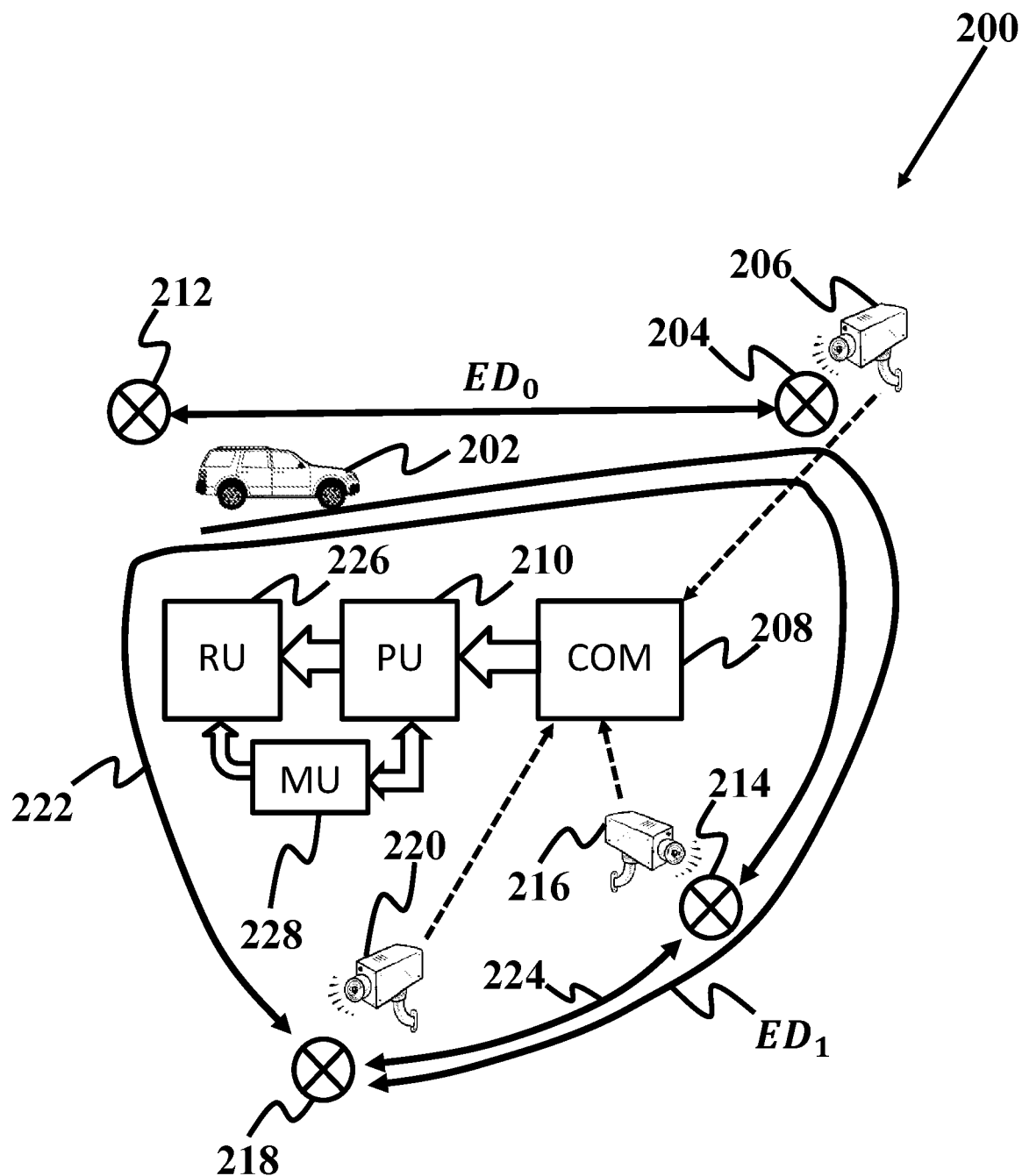
FIG. 2 shows a schematic of an exemplary embodiment of a system for estimating the mileage of a vehicle, consistent with one or more exemplary embodiments of the present disclosure.

FIG. 1 shows a flowchart of an exemplary embodiment of a method 100 for estimating a mileage of a vehicle, consistent with one or more exemplary embodiments of the present disclosure. FIG. 2 shows a schematic of an exemplary embodiment of a system 200 for estimating the mileage of a vehicle 202, consistent with one or more exemplary embodiments of the present disclosure. Referring to FIGS. 1 and 2, method 100 may include detecting a first location 204 of vehicle 202 at a first moment $t_1$ by capturing an image of vehicle 202 by a first camera 206 of a plurality of cameras (step 102), and estimating a primary distance $ED_0$ of a plurality of distances (step 104). Primary distance $ED_0$ may be associated with first location 204. In an embodiment, system 200 may include first camera 206, a communication interface 208, and a processing unit 210. In an embodiment, first camera 206 may capture or obtain a first image of vehicle 202, and communication interface 208 may communicate with the plurality of cameras. In an exemplary embodiment, communication interface 208 may include a wireless network, a local area network, a global network (such as the internet), or a communication satellite. In an exemplary embodiment, communication interface 208 may be integrated in a data center, or may be distributed among the plurality of cameras, or may include a combination of both integrated and distributed interfaces. For example, each camera may communicate with a separate communication interface, and each of the separate communication interfaces may communicate with other communication interfaces, or with a central communication interface. In an exemplary embodiment, processing unit 210 may detect first location 204 of vehicle 202 at first moment $t_1$ by importing the first image of vehicle 202 via communication interface 208 (step 102), and estimate primary distance $ED_0$ (step 104).

In an exemplary embodiment, step 104 may include calculating primary distance $ED_0$. Primary distance $ED_0$ may be calculated by processing unit 210 according to an operation defined by:

$$ED_0 = 2 \times d_0, \qquad \text{Equation (1)}$$

where $d_0$ is a length of a route between a predefined place 212, for example, a place of residence of an owner of vehicle 202, and first location 204. In an embodiment, first camera 206 may include a license plate recognition (LPR) camera. In an exemplary embodiment, Equation (1) may be used to obtain an approximation of a distance traveled by vehicle 202 in a case that a single location of vehicle 202 is detected in a sufficiently long period of time, so that it may be assumed that vehicle 202 has reached a destination. If no other location is detected, it may be assumed that vehicle 202 may have returned to its original location, for example, the predefined place 212.

In an exemplary embodiment, method 100 may further include detecting an $i^{th}$ location 214 of vehicle 202 at an $i^{th}$ moment by capturing an image of vehicle 202 by an $i^{th}$ camera 216 of the plurality of cameras (step 106), where $2 \leq i \leq N_c$ is an integer number and $N_c$ is the number of the plurality of cameras, detecting an $(i+1)^{th}$ location 218 of vehicle 202 at an $(i+1)^{th}$ moment by capturing an image of vehicle 202 by an $(i+1)^{th}$ camera 220 of the plurality of cameras (step 108), and estimating a first distance $ED_1$ of the plurality of distances (step 110). Images of vehicle 202 may be imported to processing unit 210 via communication interface 208 to detect $i^{th}$ location 214 and $(i+1)^{th}$ location 218. In an embodiment, first distance $ED_1$ may be calculated according to an operation defined by:

$$ED_1 = \Sigma_{i=1}^{N_c} d_i + ED_0, \qquad \text{Equation (2a)}$$

where $d_i$ is a length of a route between $i^{th}$ location 214 and $(i+1)^{th}$ location 218, and may be set based on a weighted or statistical average distance between successive cameras of the plurality of cameras. In an embodiment, the $i^{th}$ moment and the $(i+1)^{th}$ moment may satisfy a condition according to:

$$t_{i+1} - t_i < t_0,$$

where $t_0$ is a temporal threshold, $t_i$ is the $i^{th}$ moment, and $t_{i+1}$ is the $(i+1)^{th}$ moment. In an embodiment, temporal threshold $t_0$ may be determined based on primary distance $ED_0$, or length $d_i$, or any of the plurality of distances. For short distances (such as urban distances), it may be assumed that vehicle 202 may pass successive cameras in a small period of time, and therefore a small value may be selected for temporal threshold $t_0$ for such cases. For longer distances (such as intercity distances), it may be assumed that vehicle 202 may pass successive cameras in a larger period of time, and therefore a larger value may be selected for temporal threshold $t_0$ for such cases.

In an exemplary embodiment, the plurality of cameras may include a plurality of urban cameras. Each of the plurality of urban cameras may be installed on an urban road. Therefore, estimating first distance $ED_1$ (step 110) may include estimating a first urban distance $ED_{1,u}$ according to an operation defined by:

$$ED_{1,u} = \Sigma_{i=1}^{N_1} d_{i,u}, \qquad \text{Equation (2b)}$$

where $d_{i,u}$ is a length of a route between $i^{th}$ location 214 and $(i+1)^{th}$ location 218, and $N_1$ is the number of the plurality of urban cameras.

In an exemplary embodiment, the plurality of cameras may include a plurality of intercity cameras. Each of the plurality of intercity cameras may be installed on an intercity road. Therefore, estimating first distance $ED_1$ (step 110) may include estimating a first intercity distance according to an operation defined by:

$$ED_{1,r} = \Sigma_{i=1}^{N_2} d_{i,r}, \qquad \text{Equation (2c)}$$

where $d_{j,r}$ is a length of a route between $i^{th}$ location 214 and $(i+1)^{th}$ location 218, $N_2$ is the number of the plurality of intercity cameras, and $ED_{1,r}$ is the first intercity distance.

In an exemplary embodiment, estimating first distance $ED_1$ (step 110) may include selecting the route between $i^{th}$ location 214 and $(i+1)^{th}$ location 218 from a longest path 222 of a plurality of paths, a shortest path 224 of the plurality of paths, and an average of the plurality of paths. Each of the plurality of paths may include a plurality of roads between $i^{th}$ location 214 and $(i+1)^{th}$ location 218.

In an exemplary embodiment, method 100 may further include estimating a second distance $ED_2$ of the plurality of distances (step 112). Second distance $ED_2$ may be calculated by processing unit 210 according to an operation defined by:

$$ED_2 = (N_c - 1) d_{ave} + k, \qquad \text{Equation (3a)}$$

where $d_{ave}$ is an average distance associated with the plurality of cameras, and k is a constant. In an exemplary embodiment, average distance $d_{ave}$ may be set based on a weighted or statistical average distance between successive cameras of the plurality of cameras, and constant k may be determined based on a distance between predefined place 212 and a known place in a neighborhood of predefined place 212 (such as the location of first camera 206).

In an exemplary embodiment, second distance $ED_2$ may include a second urban distance $ED_{2,u}$. Based on Equation (3a), second urban distance $ED_{2,u}$ may be estimated according to an operation defined by:

$$ED_{2,u} = (N_1 - 1) d_{u\_ave} + k_u, \qquad \text{Equation (3b)}$$

where $d_{u\_ave}$ is an average distance associated with the plurality of urban cameras, and $k_u$ is a constant. In an exemplary embodiment, average distance $d_{u\_ave}$ may be set based on a weighted or statistical average distance between successive cameras of the plurality of urban cameras, and constant $k_u$ may be determined based on a distance between predefined place 212 and a known place in a neighborhood of predefined place 212 (such as the location of first camera 206).

In an exemplary embodiment, second distance $ED_2$ may include a second intercity distance $ED_{2,r}$. Based on Equation (3a), second intercity distance $ED_{2,r}$ may be estimated according to an operation defined by:

$$ED_{2,r} = (N_2 - 1) d_{r\_ave} + k_r, \qquad \text{Equation (3c)}$$

where $d_{r\_ave}$ is an average distance associated with the plurality of intercity cameras, and $k_r$ is a constant. In an exemplary embodiment, average distance $d_{r\_ave}$ may be set based on a weighted or statistical average distance between successive cameras of the plurality of intercity cameras, and constant $k_r$ may be determined based on a distance between predefined place 212 and a known place in a neighborhood of predefined place 212 (such as the location of first camera 206).

In an exemplary embodiment, method 100 may further include estimating a third distance $ED_3$ of the plurality of distances (step 114). Third distance $ED_3$ may be calculated by processing unit 210 according to an operation defined by:

$$ED_3 = ED_{ave} \Sigma_{m=1}^{M} T, \qquad \text{Equation (4a)}$$

where $ED_{ave}$ is an average distance associated with the plurality of distances, T is a given period of time, M is an integer constant associated with the given period of time, and $1 \leq m \leq M$ is an integer number. In an exemplary embodiment, period T may be a unit of time, for example, an hour, a day, a week, or a month, integer constant M may be number of periods that vehicle 202 may be used within a time limit (such as year), and $ED_{ave}$ may be a weighted or statistical average of the plurality of distances based on a history of traveled distances by vehicle 202.

In an exemplary embodiment, third distance $ED_3$ may include a third urban distance $ED_{3,u}$. Based on Equation (4a), third urban distance $ED_{3,u}$ may be estimated according to an operation defined by:

$$ED_{3,u} = ED_{u\_ave} \Sigma_{m=1}^{M_u} T_u, \qquad \text{Equation (4b)}$$

where $ED_{u\_ave}$ is an average distance associated with the plurality of distances, $T_u$ is a given period of time, and $M_u$ is an integer constant associated with $T_u$. In an exemplary embodiment, period $T_u$ may be a unit of time, for example, an hour, a day, a week, or a month, integer constant $M_u$ may be number of periods that vehicle 202 may be used within a time limit (such as year), and $ED_{u\_ave}$ may be a weighted or statistical average of the plurality of urban distances based on a history of traveled distances by vehicle 202.

In an exemplary embodiment, second distance $ED_3$ may include a third intercity distance $ED_{3,r}$. Based on Equation (4a), third intercity distance $ED_{3,r}$ may be estimated according to an operation defined by:

$$ED_{3,r} = ED_{r\_ave} \Sigma_{m=1}^{M_r}, \quad \text{Equation (4c)}$$

where $ED_{r\_ave}$ is an average distance associated with the plurality of intercity distances, $T_r$ is a given period of time, and $M_r$ is an integer constant associated with $T_r$. In an exemplary embodiment, period $T_r$ may be a unit of time, for example, an hour, a day, a week, or a month, integer constant $M_r$ may be number of periods that vehicle 202 may be used within a time limit (such as year), and $ED_{r\_ave}$ may be a weighted or statistical average of the plurality of intercity distances based on a history of traveled distances by vehicle 202.

In an exemplary embodiment, method 100 may further include estimating an intra-city mileage $ED_{city}$ of vehicle 202 (step 116). Intra-city mileage $ED_{city}$ may be estimated by processing unit 210 according to an operation defined by:

$$ED_{city} = f_{city}(\Sigma_{m_1=1}^{M_{u1}} ED_{1,u}, \Sigma_{m_2=1}^{M_{u2}} ED_{2,u}, ED_{3,u}), \quad \text{Equation (5)}$$

where $f_{city}$ is a function of the plurality of distances, $M_{u1}$ and $M_{u2}$ are integer constants, and $1 \leq m_1 \leq M_{u1}$ and $1 \leq m_2 \leq M_{u2}$ are integer numbers. In an embodiment, integer constants $M_{u1}$ and $M_{u2}$ may be number of periods that vehicle 202 may be used within a time limit (such as year).

In an exemplary embodiment, method 100 may further include estimating an intercity mileage $ED_{inter}$ of vehicle 202 (step 118). Intercity mileage $ED_{inter}$ may be estimated by computer system 210 according to an operation defined by:

$$ED_{inter} = f_{inter}(\Sigma_{m_1=1}^{M_{r1}} ED_{1,r}, \Sigma_{m_2=1}^{M_{r2}} ED_{2,r}, ED_{3,r}), \quad \text{Equation (6)}$$

where $f_{inter}$ is a function of the plurality of distances, $M_{r1}$ and $M_{r2}$ are integer constants, and $1 \leq m_1 \leq M_{r1}$ and $1 \leq m_2 \leq M_{r2}$ are integer numbers. In an embodiment, integer constants $M_{r1}$ and $M_{r2}$ may be number of periods that vehicle 202 may be used within a time limit (such as year).

In an exemplary embodiment, method 100 may further include estimating a total distance $ED_{total}$ according to an operation defined by:

$$ED_{total} = B_1 \times ED_{inter} + B_2 \times ED_{city} + B_3 \times H, \quad \text{Equation (7)}$$

where $B_1$, $B_2$, and $B_3$ are weighting parameters, and H is a constant. In a case that only an intercity mileage is required, weighting parameter $B_1$ may be set to 1, and $B_2$ and $B_3$ may be set to zero. In a case that only an intra-city mileage is required, weighting parameter $B_2$ may be set to 1, and $B_1$ and $B_3$ may be set to zero. In an embodiment, estimating total distance $ED_{total}$ may include calculating constant H according to an operation defined by:

$$H = L_{min} \times N_{day}, \quad \text{Equation (8)}$$

where $L_{min}$ is an estimate for a daily mileage of vehicle 202, and $N_{day}$ is a number of days associated with vehicle 202. In an embodiment, $N_{day}$ may be determined based on a number of days that vehicle 202 is intended to travel.

In an exemplary embodiment, method 100 may further include estimating an odometer mileage variable of vehicle 202 according to an operation defined by:

$$ED_{od} = ED_{total} + P + I, \quad \text{Equation (9)}$$

where P is an initial value for the odometer mileage variable, I is a correction constant, and $ED_{od}$ is the odometer mileage variable. In an exemplary embodiment, initial value P may be set according to the odometer reading prior to starting method 100. In an embodiment, correction constant I may be used if there is a need for possible corrections. For example, in some cases, an estimated value may be far from a reasonable estimate due to various types of error, such as system errors. In such cases, it may be possible to correct the estimated value by using correction constant I. By estimating the odometer mileage variable, possible odometer frauds may be prevented.

In an exemplary embodiment, processing unit 210 may compare the estimated mileage of vehicle 202 with a threshold, and in a case that the estimated mileage exceeds the threshold, processing unit 210 may send an alert to the owner of vehicle 202 via a facility such as a text message, a phone call, or an e-mail. The owner may be motivated by the alert to examine different parts of vehicle 202 and replace deteriorated parts with new ones. Another alert may also be sent to related authorities for appropriate actions.

In an exemplary embodiment, system 200 may further include a reporting unit 226. Reporting unit 226 may generate a report of processed data to be sent to related authorities. In an exemplary embodiment, reporting unit 226 may include a printer, a monitor, or a communication facility.

In an exemplary embodiment, system 200 may further include a memory unit 228. Memory unit 228 may store processed data and may send the processed data to processing unit 210 in a case that further process is required. For example, when a mileage of vehicle 202 is estimated, the mileage may be stored in memory unit 228 and may be used for further estimation in a case that a new location of vehicle 202 is detected. The stored data may also be sent to reporting unit 226 if required.

Figure 3:
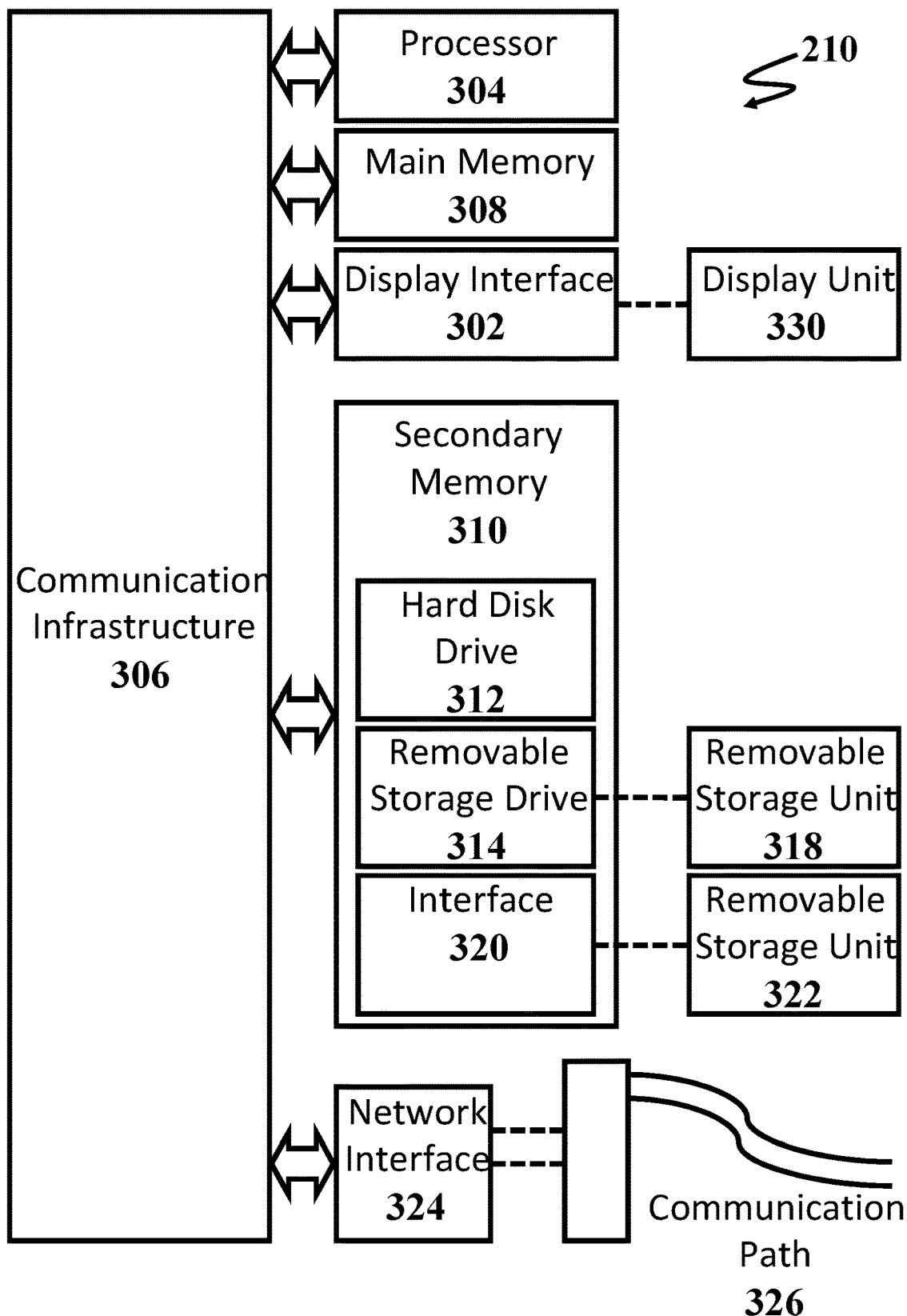
FIG. 3 shows an exemplary embodiment of a processing unit, consistent with one or more exemplary embodiments of the present disclosure.

FIG. 3 illustrates an exemplary embodiment of processing unit 210 in which an embodiment of the present disclosure, or portions thereof, may be implemented as computer-readable code, consistent with exemplary embodiments of the present disclosure. For example, method 100 may be implemented in processing unit 210 using hardware, software, firmware, tangible computer readable media having instructions stored thereon, or a combination thereof and may be implemented in one or more computer systems or other processing systems. Hardware, software, or any combination of such may embody any steps in FIG. 1.

If programmable logic is used, such logic may execute on a commercially available processing platform or a special purpose device. One of ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the present disclosure is described in terms of this example processing unit 210. After reading this description, it will become apparent to a person skilled in the relevant art how to implement the present disclosure using other computer systems and/or computer architectures.

Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 304 may be a special purpose or a general-purpose processor device. As will be appreciated by persons skilled in the relevant art, processor device 304 may also be a single processor in a multi-core/multiprocessor system, such system operating alone, or in a cluster of computing devices operating in a cluster or server farm. In an exemplary embodiment, processor device 304 may be connected to a communication infrastructure 306, for example, a bus, message queue, network, or multi-core message-passing scheme.

In an exemplary embodiment, processing unit 210 may include a display interface 302, for example a video connector, to transfer data to a display unit 330, for example, a monitor. In an exemplary embodiment, processing unit 210 may also include a main memory 308, for example, random access memory (RAM), and may also include a secondary memory 310. In an exemplary embodiment, secondary memory 310 may include a hard disk drive 312, and a removable storage drive 314. In an exemplary embodiment, removable storage drive 314 may include a floppy disk drive, a magnetic tape drive, an optical disk drive, a flash memory, or the like. In addition, removable storage drive 314 may read from and/or write to a removable storage unit 318 in a well-known manner. In an exemplary embodiment, removable storage unit 318 may include a floppy disk, magnetic tape, optical disk, etc., which may be read by and written to by removable storage drive 314. As will be appreciated by persons skilled in the relevant art, removable storage unit 318 may include a computer usable storage medium having stored therein computer software and/or data.

In alternative implementations, secondary memory 310 may include other similar means for allowing computer programs or other instructions to be loaded into processing unit 210. Such means may include, for example, a removable storage unit 322 and an interface 320. Examples of such means may include a program cartridge and cartridge interface (such as that found in video game devices), a removable memory chip (such as an EPROM, or PROM) and associated socket, and other removable storage units 322 and interfaces 320 which allow software and data to be transferred from removable storage unit 322 to processing unit 210.

In an exemplary embodiment, processing unit 210 may also include a communications interface 324. Communications interface 324 may allow software and data to be transferred between processing unit 210 and external devices. In an embodiment, communications interface 324 may include a modem, a network interface (such as an Ethernet card), a communications port, a PCMCIA slot and card, or the like. Software and data transferred via communications interface 324 may be in the form of signals, which may be electronic, electromagnetic, optical, or other signals capable of being received by communications interface 324. These signals may be provided to communications interface 324 via a communications path 326. In an exemplary embodiment, communications path 326 may carry signals and may be implemented using wire or cable, fiber optics, a phone line, a cellular phone link, an RF link or other communications channels.

In this document, the terms "computer program medium" and "computer usable medium" are used to generally refer to media such as removable storage unit 318, removable storage unit 322, and a hard disk installed in hard disk drive 312. Computer program medium and computer usable medium may also refer to memories, such as main memory 308 and secondary memory 310, which may be memory semiconductors (e.g. DRAMs, etc.).

In some exemplary embodiment, computer programs (also called computer control logic) may be stored in main memory 308 and/or secondary memory 310. Computer programs may also be received via communications interface 324. Such computer programs, when executed, enable processing unit 210 to implement the present disclosure as discussed herein. In particular, the computer programs, when executed, may enable processor device 304 to implement the processes of the present disclosure, such as the operations in method 100 discussed above. Accordingly, such computer programs represent controllers of processing unit 210. Where the present disclosure is implemented using software, the software may be stored in a computer program product and loaded into processing unit 210 using removable storage drive 314, interface 320, and hard disk drive 312, or communications interface 324.

Embodiments of the present disclosure may also be directed to computer program products including software stored on any computer useable medium. Such software, when executed in one or more data processing devices, causes a data processing device(s) to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

Example

In this example, a mileage estimation of a car during an about 7 year period by using exemplary method 100 is presented. Table 1 shows the mileage $M_o$ of the car according to the car odometer, the estimated mileage $M_e$, and the relative error RE of the estimates, given by $$RE = \left|\frac{M_e - M_o}{M_o}\right|, \qquad \text{Equation (10)}$$

TABLE 1

Odometer and estimated mileages of a car.

| Date | Odometer mileage | The estimated mileage | Relative error (%) |
|---|---|---|---|
| 2008 Apr. 3 | 0 | — | — |
| 2008 Apr. 5 | 20 | — | — |
| 2008 Apr. 20 | 30 | 28 | 6/67 |
| 2008 Apr. 21 | 45 | 40 | 11/1 |
| 2009 Apr. 18 | 15000 | 14500 | 3/33 |
| 2010 Apr. 4 | 30600 | 30000 | 1/96 |
| 2010 Apr. 14 | 31000 | 30200 | 2/58 |

TABLE 1-continued

Odometer and estimated mileages of a car.

| Date | Odometer mileage | The estimated mileage | Relative error (%) |
|---|---|---|---|
| 2011 Apr. 14 | 45000 | 43500 | 3/33 |
| 2011 Jun. 23 | 49000 | 47000 | 4/08 |
| 2011 Jun. 24 | 49100 | 47100 | 4/07 |
| 2011 Jun. 25 | 49200 | 47200 | 4/07 |
| 2014 Apr. 13 | 67000 | 64500 | 3/73 |
| 2014 Apr. 18 | 67050 | 64550 | 3/73 |
| 2013 Apr. 9 | 88500 | 85800 | 3/05 |
| 2013 Apr. 14 | 88700 | 85700 | 3/38 |
| 2013 Apr. 16 | 89000 | 86000 | 3/37 |
| 2014 Apr. 19 | 109500 | 106000 | 3/2 |
| 2014 Aug. 25 | 117000 | 113500 | 2/99 |
| 2014 Aug. 26 | 117050 | 113540 | 3 |
| 2014 Aug. 27 | 117070 | 113560 | 3 |
| 2015 Apr. 17 | 120000 | 116000 | 3/33 |

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for estimating a mileage of a vehicle, the method comprising:

detecting an $i^{th}$ location of the vehicle by capturing an image of the vehicle by an $i^{th}$ camera of a plurality of urban cameras, where $1 \leq i \leq N_1$ is an integer number and $N_1$ is the number of the plurality of urban cameras;

detecting an $(i+1)^{th}$ location of the vehicle by capturing an image of the vehicle by an $(i+1)^{th}$ camera of the plurality of urban cameras;

estimating a first urban distance of a plurality of urban distances according to an operation defined by:

$$ED_{1,u} = \sum_{i=1}^{N_1} d_{i,u},$$

where $d_{i,u}$ is a length of a route between the $i^{th}$ location and the $(i+1)^{th}$ location, and $ED_{1,u}$ is the first urban distance;

estimating a second urban distance of the plurality of urban distances according to an operation defined by:

$$ED_{2,u} = (N_1 - 1)d_{u\_ave} + k_u,$$

where $d_{u\_ave}$ is an average distance associated with the plurality of urban cameras, $k_u$ is a constant, and $ED_{2,u}$ is the second urban distance;

estimating a third urban distance of the plurality of urban distances according to an operation defined by:

$$ED_{3,u} = ED_{u\_ave} \sum_{m=1}^{M_u} T_u,$$

where $ED_{u\_ave}$ is an average distance associated with the plurality of distances, $T_u$ is a given period of time, $M_u$ is an integer constant associated with the given period of time, $1 \leq m \leq M_u$ is an integer number, and $ED_{3,u}$ is the third urban distance;

estimating an intra-city mileage of the vehicle according to an operation defined by:

$$ED_{city} = f_{city}\left(\sum_{m_1=1}^{M_{u1}} ED_{1,u}, \sum_{m_2=1}^{M_{u2}} ED_{2,u}, ED_{3,u}\right),$$

where $f_{city}$ is a function of the plurality of urban distances, $M_{u1}$ and $M_{u2}$ are integer constants, $1 \leq m_1 \leq M_{u1}$ and $1 \leq m_2 \leq M_{u2}$ are integer numbers, and $ED_{city}$ is the intra-city mileage;

detecting a $j^{th}$ location of the vehicle by capturing an image of the vehicle by a $j^{th}$ camera of a plurality of intercity cameras, where $1 \leq j \leq N_2$ is an integer number and $N_2$ is the number of the plurality of intercity cameras;

detecting a $(j+1)^{th}$ location of the vehicle by capturing an image of the vehicle by a $(j+1)^{th}$ camera of the plurality of intercity cameras;

estimating a first intercity distance of a plurality of intercity distances according to an operation defined by:

$$ED_{1,r} = \sum_{j=1}^{N_2} d_{j,r},$$

where $d_{j,r}$ is a length of a route between the $j^{th}$ location and the $(j+1)^{th}$ location, and $ED_{1,r}$ is the first intercity distance;

estimating a second intercity distance of the plurality of intercity distances according to an operation defined by:

$$ED_{2,r} = (N_2-1)d_{r\_ave} + k_r,$$

where $d_{r\_ave}$ is an average distance associated with the plurality of intercity cameras, $k_r$ is a constant, and $ED_{2,r}$ is the second intercity distance;

estimating a third intercity distance of the plurality of intercity distances according to an operation defined by:

$$ED_{3,r} = ED_{r\_ave} \sum_{m=1}^{M_r} T_r,$$

where $ED_{r\_ave}$ is an average distance associated with the plurality of intercity distances, $T_r$ is a given period of time, $M_r$ is an integer constant associated with the given period of time, $1 \leq m \leq M_r$ is an integer number, and $ED_{3,r}$ is the third intercity distance;

estimating an intercity mileage of the vehicle according to an operation defined by:

$$ED_{inter} = f_{inter}\left(\sum_{m_1=1}^{M_{r1}} ED_{1,r}, \sum_{m_2=1}^{M_{r2}} ED_{2,r}, ED_{3,r}\right),$$

where $f_{inter}$ is a function of the plurality of intercity distances, $M_{r1}$ and $M_{r2}$ are integer constants, $1 \leq m_1 \leq M_{r1}$ and $1 \leq m_2 \leq M_{r2}$ are integer numbers, and $ED_{inter}$ is the intercity mileage;

estimating a total distance according to an operation defined by:

$$ED_{total} = B_1 \times ED_{inter} + B_2 \times ED_{city} + B_3 \times H,$$

where $B_1$, $B_2$, and $B_3$ are weighting parameters, and H is a constant; and estimating an odometer mileage variable of the vehicle according to an operation defined by:

$$ED_{od} = ED_{total} + P + I,$$

where P is an initial value for the odometer mileage variable, I is a correction constant, and $ED_{od}$ is the odometer mileage variable.

2. The method of claim 1, wherein estimating the total distance comprises calculating constant H according to an operation defined by:

$$H = L_{min} \times N_{day},$$

where $L_{min}$ is an estimate for a daily mileage of the vehicle and $N_{day}$ is a number of days associated with the vehicle.

3. A method for estimating a mileage of a vehicle, the method comprising:
detecting an $i^{th}$ location of the vehicle at an $i^{th}$ moment by capturing an image of the vehicle by an $i^{th}$ camera of a plurality of cameras, where $1 < i < N_c$ is an integer number and $N_c$ is the number of the plurality of cameras;
detecting an $(i+1)^{th}$ location of the vehicle at an $(i+1)^{th}$ moment by capturing an image of the vehicle by an $(i+1)^{th}$ camera of the plurality of cameras; and
estimating a first distance of a plurality of distances according to an operation defined by:

$$ED_1 = \sum_{i=1}^{N_c} d_i + ED_0,$$

where $d_i$ is a length of a route between the $i^{th}$ location and the $(i+1)^{th}$ location, $ED_0$ is a primary distance, and $ED_1$ is the first distance.

4. The method of claim 3, further comprising estimating the primary distance according to an operation defined by:

$$ED_0 = 2 \times d_0,$$

where $d_0$ is a length of a route between a predefined place and a first location of the vehicle.

5. The method of claim 3, wherein capturing the image of the vehicle by $i^{th}$ camera comprises capturing the image of the vehicle by a license plate recognition (LPR) camera.

6. The method of claim 3,
wherein the $i^{th}$ moment and the $(i+1)^{th}$ moment satisfy a condition according to:
$t_{i+1} - t_i < t_0$, where $t_0$ is a temporal threshold, $t_i$ is the $i^{th}$ moment, and $t_{i+1}$ is the $(i+1)^{th}$ moment.

7. The method of claim 6, wherein estimating the first distance comprises selecting a route between the $i^{th}$ location and the $(i+1)^{th}$ location from a longest path of a plurality of paths, a shortest path of the plurality of paths, and an average of the plurality of paths, each of the plurality of paths comprising a plurality of roads between the $i^{th}$ location and the $(i+1)^{th}$ location.

8. The method of claim 6, further comprising:
estimating a second distance of the plurality of distances according to an operation defined by:

$$ED_2=(N_c-1)d_{ave}+k,$$

where $d_{ave}$ is an average distance associated with the plurality of cameras, k is a constant, and $ED_2$ is the second distance.

9. The method of claim 8, further comprising:
estimating a third distance of the plurality of distances according to an operation defined by:

$$ED_3 = ED_{ave}\sum_{m=1}^{M} T,$$

where $ED_{ave}$ is an average distance associated with the plurality of distances, T is a given period of time, M is an integer constant associated with the given period of time, $1 \le m \le M$ is an integer number, and $ED_3$ is the third distance.

10. The method of claim 9, further comprising:
estimating an intra-city mileage of the vehicle according to an operation defined by:

$$ED_{city} = f_{city}\left(\sum_{m_1=1}^{M_1} ED_1, \sum_{m_2=1}^{M_2} ED_2, ED_3\right),$$

where $f_{city}$ is a function of the plurality of distances, $M_1$ and $M_2$ are integer constants, $1 \le m_1 \le M_1$ and $1 \le m_2 \le M_2$ are integer numbers, and $ED_{city}$ is the intra-city mileage.

11. The method of claim 9, further comprising:
estimating an intercity mileage of the vehicle according to an operation defined by:

$$ED_{inter} = f_{inter}\left(\sum_{m_1=1}^{M_1} ED_1, \sum_{m_2=1}^{M_2} ED_2, ED_3\right),$$

where $f_{inter}$ is a function of the plurality of distances, $M_1$ and $M_2$ are integer constants, $1 \le m_1 \le M_1$ and $1 \le m_2 \le M_2$ are integer numbers, and $ED_{inter}$ is the intercity mileage.

12. A system for estimating a mileage of a vehicle, the system comprising:
an $i^{th}$ camera of a plurality of cameras, where $1<i<N_c$ is an integer number and $N_c$ is the number of the plurality of cameras, the $i^{th}$ camera configured to capture an $i^{th}$ image of the vehicle at an $i^{th}$ moment;
an $(i+1)^{th}$ camera of the plurality of cameras, the $(i+1)^{th}$ camera configured to capture an $(i+1)^{th}$ image of the vehicle at an $(i+1)^{th}$ moment; and
a processor configured to:
receive the $i^{th}$ image of the vehicle from the $i^{th}$ camera;
detect and $i^{th}$ location of the vehicle based on the $i^{th}$ image of the vehicle;
receive the $(i+1)^{th}$ image of the vehicle from the $(i+1)^{th}$ camera;
detect an $(1+1)^{th}$ location of the vehicle based on the $(1+1)^{th}$ image of the vehicle; and
estimate a first distance of the plurality of distances according to an operation defined by:

$$ED_1=\Sigma_{i-1}^{N_c}d_i+ED_0,$$

where $d_i$ is a length of a route between the $i^{th}$ location and the $(i+1)^{th}$ location, $ED_0$ is a primary distance, and $ED_1$ is the first distance.

13. The system of claim 12, wherein the processor is further configured to estimate the primary distance according to an operation defined by:

$$ED_0=2 \times d_0,$$

where $d_0$ is a length of a route between a place of residence of an owner of the vehicle and a first location of the vehicle.

14. The system of claim 12, wherein
the $i^{th}$ moment and the $(i+1)^{th}$ moment satisfy a condition according to:
$t_{i+1}-t_i<t_0$, where $t_0$ is a temporal threshold, $t_i$ is the $i^{th}$ moment, and $t_{i+1}$ is the $(i+1)^{th}$ moment.

15. The system of claim 14, wherein the processor is further configured to estimate a second distance of the plurality of distances according to an operation defined by:

$$ED_2=(N_c-1)d_{ave}+k,$$

where $d_{ave}$ is an average distance associated with the plurality of cameras, k is a constant, and $ED_2$ is the second distance.

16. The system of claim 15, wherein the processor is further configured to estimate a third distance of the plurality of distances according to an operation defined by:

$$ED_3 = ED_{ave}\sum_{m=1}^{M} T,$$

where $ED_{ave}$ is an average distance associated with the plurality of distances, T is a given period of time, M is an integer constant associated with the given period of time, $1 \le m \le M$ is an integer number, and $ED_3$ is the third distance.

17. The system of claim 16, wherein the processor is further configured to estimate an intra-city mileage of the vehicle according to an operation defined by:

$$ED_{city} = f_{city}\left(\sum_{m_1=1}^{M_1} ED_1, \sum_{m_2=1}^{M_2} ED_2, ED_3\right),$$

where $f_{city}$ is a function of the plurality of distances, $M_1$ and $M_2$ are integer constants, $1 \le m_1 \le M_1$ and $1 \le m_2 \le M_2$ are integer numbers, and $ED_{city}$ is the intra-city mileage.

18. The system of claim 16, wherein the processor is further configured to estimate an intercity mileage of the vehicle according to an operation defined by:

$$ED_{inter} = f_{inter}\left(\sum_{m_1=1}^{M_1} ED_1, \sum_{m_2=1}^{M_2} ED_2, ED_3\right),$$

where $f_{inter}$ is a function of the plurality of distances, $M_1$ and $M_2$ are integer constants, $1 \leq m_1 \leq M_1$ and $1 \leq m_2 \leq M_2$ are integer numbers, and $ED_{inter}$ is the intercity mileage.

\* \* \* \* \*